Dec. 29, 1925. 1,567,601

O. A. KENYON

ELECTRIC WELDING

Filed Dec. 28, 1917

Inventor:
Otis A. Kenyon
By T. Walter Fowler
Attorney.

Patented Dec. 29, 1925.

1,567,601

UNITED STATES PATENT OFFICE.

OTIS ALLEN KENYON, OF NEW YORK, N. Y., ASSIGNOR TO WESTINGHOUSE ELECTRIC & MANUFACTURING COMPANY, A CORPORATION OF PENNSYLVANIA.

ELECTRIC WELDING.

Application filed December 28, 1917. Serial No. 209,343.

*To all whom it may concern:*

Be it known that I, OTIS ALLEN KENYON, a citizen of the United States, residing at New York city, in the county of New York and State of New York, have invented certain new and useful Improvements in Electric Welding, of which the following is a specification.

This invention relates to electric arc welding, and it consists, essentially, in providing a means controlled by the voltage across the arc for maintaining a constant length of arc. In addition to the foregoing, the invention comprehends the employment of a means for adjusting the length of the arc to be maintained.

The invention further consists of the parts and the arrangements and combination of parts which I will hereinafter describe and claim.

In the accompanying drawings forming part of this specification and in which similar reference characters indicate like parts in the several views.

Figure 1:
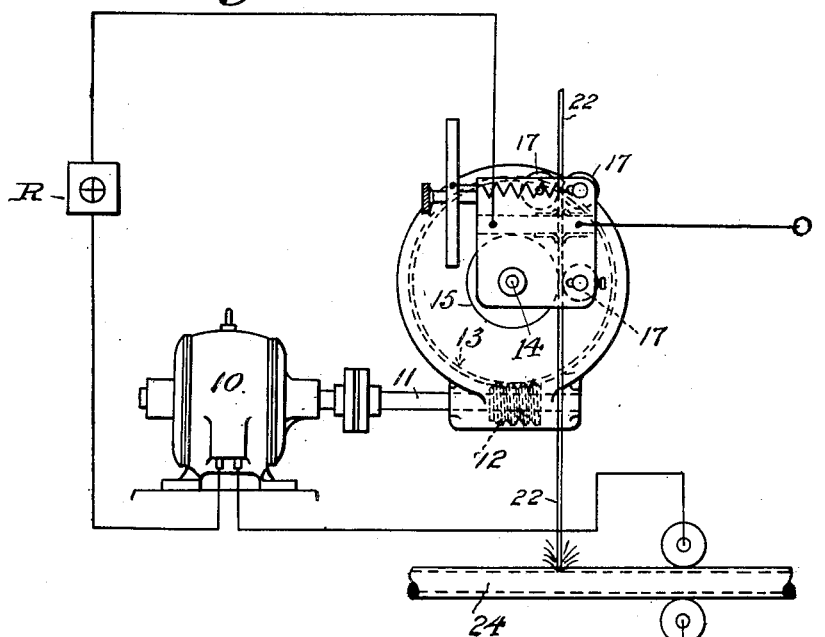
Fig. 1 illustrates in front elevation, one embodiment of my present invention.
Figure 2:
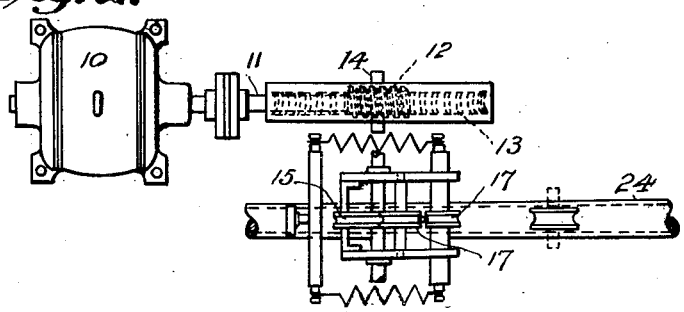
Fig. 2 is a top plan view of the same.

In arc welding practice with the metallic pencil, the operation is conducted by hand manipulation of the pencil. Mechanical feeding of the electrodes of an arc, has been accomplished for many years by various types of mechanisms in arc lamps. However, these devices are not suitable for the same purpose in arc welding, because the regulation of the arc is largely accomplished by its manipulation as dictated by the experience of the welder.

The closed-circuit system of arc welding as covered by my prior Patent No. 1,181,227, dated May 2, 1916, and the heat control features of said system, as covered by my Patents Nos. 1,218,265; 1,218,266; 1,218,267; 1,218,268; and 1,218,269, dated March 6, 1917, permit accurate adjustment of the heat production in the metal of the weld. Therefore, a welding arc connected in my closed-circuit system is excellently adapted to manipulation by mechanical mechanism.

The temperature of the metal is determined by the current through the arc and the voltage across it. The voltage has practically no effect upon the rate of melting of the welding pencil, but it does affect the depth of penetration of melting on the side of the arc where the metal is deposited.

The current through the arc affects directly the rate of melting of the pencil. It also affects to a still greater degree than the voltage the depth of penetration of the point where the metal is deposited.

For a given current, that is, given rate of melting, the amount of heat put into the molten metal on its way through the arc is directly proportional to the voltage across the arc. Therefore, it is of the greatest importance that the voltage across the arc be kept at all times at the minimum value suitable for the kind of work that is being done.

Any heat put into the metal after it is melted is excess heat. Not only does it raise the temperature far above the critical point, but it prolongs the period of time that must elapse after it returns below the critical point, and the longer this period, the greater will be the tendency to form coarse grained metal, which in practice is called burnt metal.

In order to do satisfactory work with an automatically fed welding pencil, the length of the arc must be kept within very narrow limits at its proper value. With stepwise methods of feeding, this is not possible.

The present invention provides a means of feeding the pencil into the weld continuously, the speed of feeding being determined by the length of the arc, so that the slightest change in the length of the arc, one way or the other, will change the speed sufficiently to restore the length at once to its proper value.

This is accomplished in the illustrated embodiment of my invention, by driving the feeding mechanism with an electric motor which is connected directly across the terminals of the arc. Increasing the length of the arc speeds up the motor, while decreasing the arc slows it down.

In the accompanying drawings 10 is an electric motor of any desired and appropriate type on the shaft 11 of which is secured a worm, 12, which engages a worm wheel, 13, of larger size adapted to reduce the speed of the driving shaft, 14, which in the instance shown is arranged at right angles to the motor shaft, and which driving shaft is designed to impart the proper value for feeding the pencil into the weld.

In connection with the driving shaft I employ a suitable feeding mechanism which is herein shown as comprising a driving roller, 15, and three friction rollers, 17, for holding the pencil in line. If it is desired to impart an angular position to the pencil, this may be obtained by rotating the feed mechanism around the driving shaft, 14. In the present instance, the progress of the welding seam is obtained by the movement of the work, the feeding mechanism remaining in a stationary position.

Figure 3:
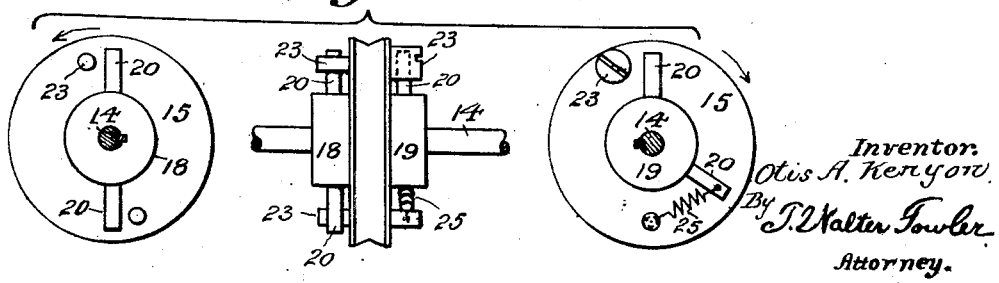
Fig. 3 illustrates detailed views of the driving roller and means for starting the arc.

Referring to the detailed construction of Fig. 3, where the driving mechanism for the driving feed roller is fully shown, said feed roller, 15, is loose on the driving shaft and which shaft is provided with collars, 18 and 19, which are keyed to said shaft. The feed roller, 15, is designed to be driven in a forward direction by means of pins, 20, and the aforesaid collar, 19, is employed for determining the initial arc length, which may be done as follows: The welding electrode, 22, which may be a coil of wire or a rod, is pushed between the rolls of the feeding mechanism and as it passes the roller, 15, it turns said roller in the direction of the arrow (Fig. 3), until the pin, 20, strikes the pin, 23, on the face of the feed roller, 15, when the forward motion of the roller is checked and the electrode is then pushed on until it meets or substantially contacts with the piece of work to be welded and which in the present instance is shown as a tube, 24. The aforesaid collars, 18 and 19, which are keyed to the driving shaft, are provided with the radially extending pin or pins, 20, and projecting from the face of the feed roller, 15, is the coacting pin or pins, 23, and as soon as the before mentioned pressure on the electrode is released, a spring, 25, which is connected to the collar, 19, and feed roller, 15, respectively, exerts its power to pull the roller, 15, back until the pin, 23, strikes the companion pin, 20, thus establishing an arc which starts the motor, 10, to give rotation to the shaft, 14, and causing the pin, 20, to drive the feed roller. The length of the initial arc is adjusted by rotating the pin, 20, which is of eccentric formation, thus varying the gap between this pin and the pin, 23. The operating length of the arc is adjusted by means of a rheostat, R, of any suitable character, and which is in series with the motor. The current for welding is fed into the pencil by means of sliding contacts in the feeding mechanism, as illustrated in Fig. 1, which contacts may be of any suitable character; some current also enters by the rollers which are in multiple with the contacts.

From the foregoing, it will be understood that in the present invention I have provided a means which is automatically controlled for feeding the usual metallic pencil into the weld continuously, and at a speed which is determined by the length of the arc, whereby the slightest change in the length of said arc, one way or the other, will change the speed sufficiently to restore the length at once to its proper value. I do not limit myself to the exact construction and arrangement of parts shown and described, but intend that the invention shall cover any and all equivalent arrangements within the scope of the appended claims.

Having thus described my invention what I claim as new and desire to secure by Letters Patent is:—

1. An electric arc welding mechanism comprising a movable electrode, a feed roller frictionally engaging said electrode, a movable mounting for said feed roller permitting the latter to be rotated to advance said electrode into contact with the work, a spring member for rotating said feed roller in the reverse direction to strike the arc, and stop means on said feed roller for predetermining the arc length.

2. An automatic electric welding machine of the type having a movable electrode, a feed roller therefor, and regulating means including a source of motive power having a mechanical connection with said feed roller for maintaining predetermined welding conditions, characterized by the fact that said mechanical connection includes a yieldable, lost-motion connection whereby said feed roller may be rotated independently of said source of motive power to strike the arc.

3. In an automatic electric welding system, means for establishing and controlling an arc comprising a fusible electrode, a rotatable drive member, a rotatable feed roller loosely mounted with respect to said drive member and frictionally engaging said electrode, a drive pin secured to said drive member, a projection on said feed roller, and resilient means for normally maintaining said pin and said projection in engagement and for permitting said feed roller to be rotated against said resilient means for the purpose of striking the arc.

In testimony whereof I affix my signature.

OTIS ALLEN KENYON.